Figure 1:
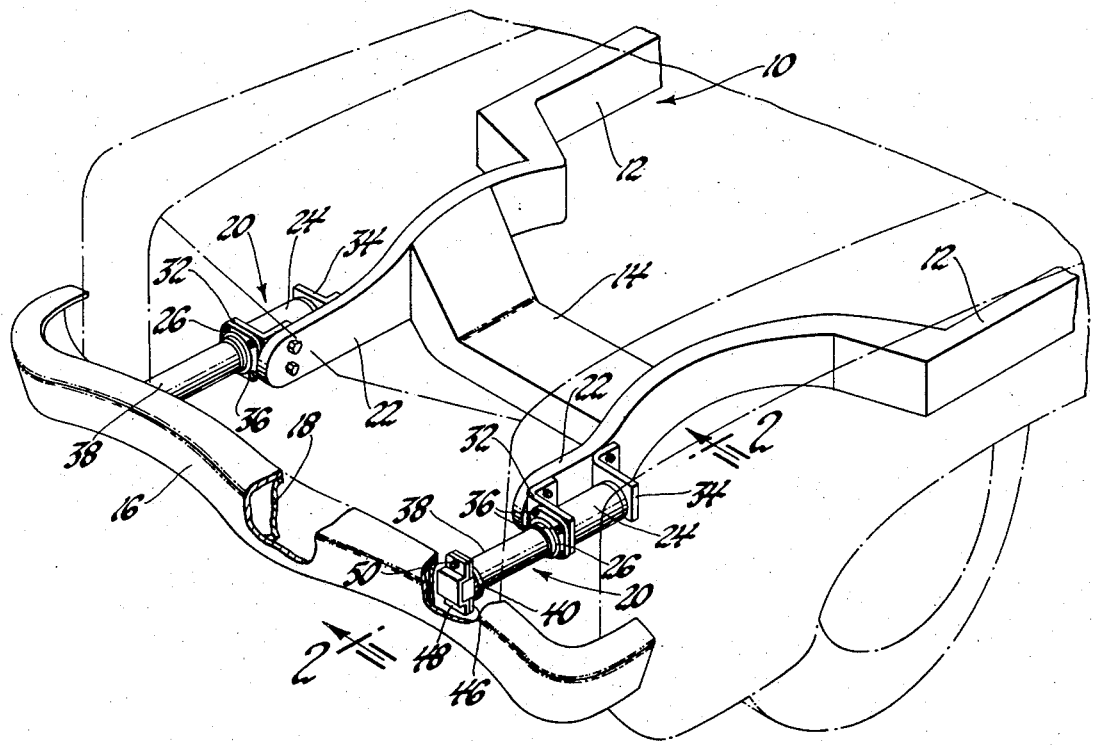

United States Patent [19]

Fannin et al.

[11] 3,814,219

[45] June 4, 1974

[54] ENERGY DISSIPATING UNIT
[75] Inventors: Wayne V. Fannin; Harold E. Schultze, both of Dayton, Ohio
[73] Assignee: General Motors Corporation, Detroit, Mich.
[22] Filed: Mar. 29, 1973
[21] Appl. No.: 345,890

[52] U.S. Cl................ 188/282, 188/317, 267/116, 293/70
[51] Int. Cl. ......................... F16f 9/34, B60r 19/06
[58] Field of Search.... 137/543.15; 267/64 R, 64 B, 267/65 R, 116, 139; 188/282, 288, 317, 314; 293/DIG. 2, 70, 85, 86

[56] References Cited
UNITED STATES PATENTS
2,553,352  5/1951  Bergesen..................... 137/543.15
3,677,561  7/1972  McNally.......................... 267/65 R FOREIGN PATENTS OR APPLICATIONS
655,560  7/1951  Great Britain................ 137/543.15

Primary Examiner—M. Henson Wood, Jr.
Assistant Examiner—Robert Saifer
Attorney, Agent, or Firm—D. L. Ellis

[57] ABSTRACT

An energy absorbing bumper system for automotive vehicles includes a pair of fluid-filled telescopic cylinder units at respective ends of the bumper mounting the same to the vehicle chassis. Variable volume fluid chambers within each unit have the fluid flow therebetween controlled by a force magnitude controlling valve assembly including a pin with a tapered end proximate an orifice communicating the chambers and a compression spring-urged valve sleeve closing an annular gap between the tapered pin end and the edge of the orifice.

5 Claims, 2 Drawing Figures

PATENTED JUN 4 1974

3,814,219

ENERGY DISSIPATING UNIT

This invention relates to energy dissipating units and more particularly to an improved hydraulic type energy dissipating unit for mounting bumpers on a vehicle chassis and for like applications.

In U.S. Pat. No. 3,700,273 issued Oct. 24, 1972, to Jackson et al. and assigned to the assignee of the present inventon, there is disclosed an energy absorbing bumper system for automobiles comprising fluid-filled telescopic cylinder units wherein variable volume fluid chambers therein defined by a piston or movable wall has the fluid communication therebetween controlled by a tapered metering rod and a cooperative fixed orifice to control the magnitude of force developed in the unit during bumper impacts.

The present invention relates to the type of unit disclosed in the Jackson et al. patent and provides an alternate improved pop-off or relief type of force magnitude-controlling valve for communicating the variable volume fluid chambers of the unit.

One feature of the invention is that it provides such an energy dissipating unit with a force magnitude controlling valve including a tapered pin juxtaposed proximate to the orifice edge of an aperture in the movable wall of the unit communicating the chambers, with an annularly flanged sleeve being slidably mounted on the pin to close the orifice against communication and defining a hydrostatic pressure surface, the taper of the pin end cooperating with the orifice edge to define a dynamic fluid flow area larger than the hydrostatic pressure surface in accordance with the degree of the taper on the pin end.

Another feature of the invention is that it provides an energy dissipating unit with the aforedescribed feature and further including a retainer cup on the movable wall for mounting the pin and sleeve and utilizing a coil compression spring, fluid flow being routed through the orifice and through exhaust apertures in the cup in a manner to impinge such flow on the coils of the spring and dampen any instability in the action of the valve.

Yet another feature of this invention is in the provision of a constricted return flow fluid path under the flange of the valve sleeve occurring during a return or restoring stroke of the energy dissipating unit and via notches formed in an orifice lip of the movable wall in accordance with a preferred embodiment of the invention.

Figure 2:
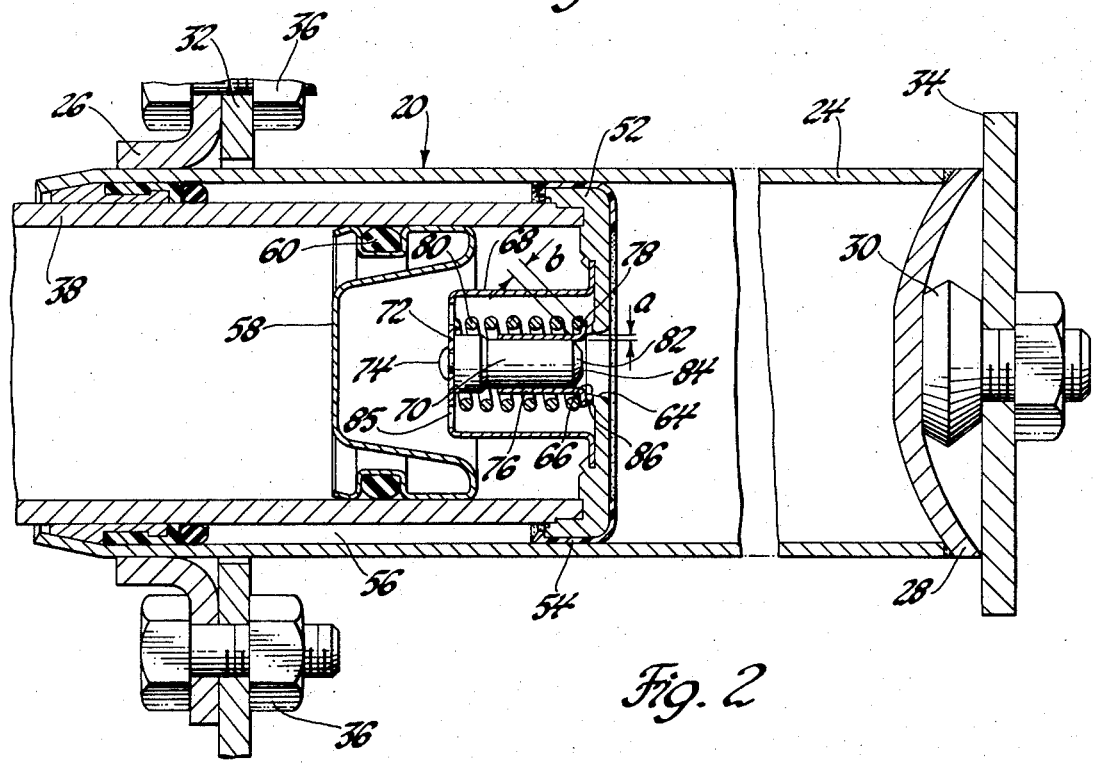

These and other features of the invention will be readily apparent from the following specification and from the drawings wherein:

FIG. 1 is a perspective view of an automotive vehicle chassis frame including an energy absorbing bumper assembly according to this invention; and FIG. 2 is an enlarged sectional view taken generally along the plane indicated by lines 2—2 of FIG. 1 showing the bumper bar in its normal extended position.

Referring now particularly to FIG. 1 of the drawings, reference number 10 generally designates a separate chassis frame of an automotive vehicle which typically includes a laterally spaced pair of longitudinally extending side rails 12 interconnected in the forward portions of the frame by a front cross member 14. It will be understood that rather than the separate chassis frame illustrated herein, the automotive bumper applications of this invention are equally well adapted to be employed in unibody construction.

The bumper assembly includes a generally conventional impact bumper or face bar 16 which includes an inner reinforcing plate 18. Energy absorbing chassis mount units, each designated generally as 20, are provided adjacent each end of bumper bar 16 for rigid attachment between reinforcing plate 18 and forward horns 22 of the side rails 12.

Referring to FIGS. 1 and 2, each mounting unit 20 includes an outer cylinder 24 of a selected stock thickness suitable to the contemplated impact fluid pressure and normal bumper mount loadings to be encountered. Adjacent its outer or forward end, each cylinder 24 has welded thereto a surrounding bracket 26 extended with an annular portion embracing the cylinder and a flange provided with bolt holes, while at its inner or rearward end, the cylinder is closed by a cap 28 which may have welded or otherwise rigidly affixed centrally thereto a threaded stud 30. On each frame horn 22, a spaced pair of L-shaped brackets are rigidly attached, the forward one 32 of which includes an aperture for receiving cylinder 24 and has bracket 26 secured thereto by bolts 36 while the rearward one of which 34 may receive the stud 30 which is threaded over with a nut thereby to rigidly mount the cylinder 34 on the frame horn at these suitably longitudinally spaced locations of the brackets.

The mounting unit 20 further includes an inner or second cylinder member 38 also of properly chosen stock thickness and telescopically received within cylinder 24 and extending forwardly therefrom, with a weld plate 40 being provided at its outer terminal end. Welded to plate 40 is a sleeve, not shown, extending vertically and receiving a rubber or similar elastic bushing bonded or otherwise attached intermediate the sleeve and an inner mounting bar 46 which is provided with flattened ends apertured for the reception of mounting bolts. A generally U-shaped mounting strap 48 is welded or otherwise affixed at the proper laterally spaced locations on the bumper bar reinforcing plate 18 to directly engage the outer sides of respective sleeves, bent ears of each strap being apertured to receive bolts 50 extending through the mounting bar 46 and threaded over with nuts to secure the bumper 16 and cylinders 38 together.

At the inner or rearward end of each cylinder 38, a wall member in the form of a cylinder cap 52 generally delineates opposite fluid chambers in the mounting unit 20 each filled with a suitable fluid such as oil. A liner or bearing sleeve 54 of glass-filled nylon or other plastic material exhibiting suitable antifriction, antiscoring and load deformation and stiffness properties is received over the cylinder cap, there properties being chosen to best accommodate the required free sliding movement in unit 20 as well as the large radial forces seen by the bearing under impact and under jacking and towing forces applied to bumper bar 16. Sufficient free sliding movement is permitted between the cylinder 24 and the sleeve 54 by provision of adequate clearance. For example, with the inner diameter of cylinder 24 approximating 2.5 inches, an outer diameter for sleeve 54 providing a total or diametrical clearance of about 0.01 inch is preferred. By the use of such clearance or additionally by shallow grooves provided in the sleeve, not shown, sufficient fluid communication is provided between the remote side of the cylinder cap 52 and the exterior of inner cylinder 38 in a cylinder interspace 56, so that the right hand fluid working chamber of unit 20 is comprised of the volume rightwardly of cylinder cap 52 as well as this interspace 56.

Within inner cylinder 38, a piston 58 fabricated of sheet metal or the like is slidably received and fitted with an O-ring 60 to adequately sealingly bound or define one side of the working fluid chamber within cylinder 38 leftward of the cylinder cap 52, as shown in the drawings. A quantity of gas is compressed within the volume between piston 58 and plate 40, such gas being injected through plate 40 by conventional techniques during unit assembly and using as a closure a ball welded within the gas filling orifice in plate 40 following the gas insertion. In the typical unit 20 such as described, the inside diameter of cylinder 24 provides for an effective piston area operation on cylinder 38 of approximately 5 square inches. This, taken with initial compression of the gas, which may for example be nitrogen, of approximately 150 p.s.i. when the parts are in the normal extended position shown in FIG. 2, yields a force of approximately 750 pounds from the gas-compressed fluid urging the inner cylinder 38 in an outward direction to the normal extended position.

An aperture 64 is provided in the piston cylinder cap 52 and, as shown, is specially formed in a preferred embodiment to have a projecting lip 66 from the inner wall of the latter. A retainer cup 68 is mounted to such inner wall of the piston cylinder cap by staking over a shoulder thereof on an annular flange at one end of the cup, and a pin 70 is affixed to the remote end wall 72 of the cup by having a reduced diameter retention end of the pin extend through an aperture in end wall 72 and headed over at 74. On the smooth shank of the pin 70 is relatively freely slidably mounted a valve sleeve 76 which may be constructed of steel or suitable plastic material and which is provided with an annular flange 78 adapted for engagement with the juxtaposed edge of lip 66. A coil compression spring 80 is mounted between the end wall 72 of the cup and flange 78 of the valve sleeve to urge the latter into such engagement as shown.

The pin 70 is provided with a tapered or frustoconical surface 82 on its end 84 proximate the lip 66. Such taper is predetermined by computation and suitable testing to control the dynamic fluid flow area exhibited in the valve during bumper impact conditions as will appear. It is apparent that the flange 78 provides a hydrostatic pressure-differential operating area determinative of the operation of this valve and which is defined by the difference in diameter between the inner surface of lip 66 and the inside diameter of the major body portion of the valve sleeve 76. Under impact forces on the bumper 16 forcing the piston tube or cylinder subassembly 38 rightwardly from its normal position as shown in FIG. 2, increasing pressure of the fluid in the right hand fluid chamber is exposed to one side of this annular area, designated by the dimension $a$, while a lower pressure will be exhibited at the opposite side of such area as is well-known. The coil compression spring 80, as is also well-known, may be provided with an assembled preload between the cup and the flange 78 to require a predetermined force arising from the pressure differential exerted on such flange before the flange will be moved leftwardly from the lip 66 to permit fluid flow through aperture 64 and between the chambers of the unit. It will be observed that an advantage available from the construction of the valve assembly so far described is in the relatively narrow dimension $a$ for this hydrostatic surface and the consequence that the compression spring 80 may be constructed to have light strength and small physical size yet still achieve a relatively high level of relief or lift-off pressure differential between the fluid chambers of the unit. Conservation of space and material costs in the construction of the valve assembly are thus realized.

Depending upon the application of the energy dissipating units to a particular operational environment, this valve assembly may provide an advantage over the unit disclosed in the Jackson et al patent in establishing a working pressure in the righthand fluid chamber of the unit which will remain fairly constant throughout the stroking of the unit, even as lesser amounts of impact energy are exhibited thereto during the succeeding increments of the history of a bumper impact causing such displacement. In the Jackson et al. patent, it is noted that the tapering metering pin is provided with a profile designed to create varying amounts of flow orifice area to compensate for the variable velocity of displacement that occurs in a typical impact stroke, thereby to approximate as far as possible a constant force imposed within the unit throughout such displacement. There, however, the metering rod must necessarily be designed to accomplish this for a single set of conditions reflecting perhaps the worst or highest amounts of impact energy contemplated in the operation of the unit, and for lesser amounts of impact energy the metering rod is not effective to establish the same degree of force-displacement uniformity in the unit. Again, while this may be of little consequence in some applications of the instant invention, it provides the alternative of employing a relief or pop-off type of valve which, regardless of the differences in total amounts of energy to be dissipated during various types of bumper impact, will maintain the force in the unit at a generally constant level throughout the amount of excursion of the unit to dissipate such energy.

It has been found that expeditious tailoring of the constant force in the unit may be readily achieved with basically predetermined sizes of the shank of the pin and the inner diameter of lip 66, along with proper tapering of the surface 82. The hydrostatic pressure surface $a$ must be a fixed area sized in concert with sizing of spring 80, to be reflective of a desired lift-off pressure for incipient fluid flow through the aperture 64. The tapering of surface 82 provides the necessary amount of dynamic flow area to permit an acceptable rate of unit displacement under unit impact and hold fluid pressures and forces at acceptable values during such displacement. The tapered surface may be formed at an angle selected to provide such flow area suitably determined by computation and testing to achieve these results. This flow area is indicated as the dimension $b$ of an annulus between the edge of lip 66 and the largest diameter of the pin 70 in this tapered region of its shank. This dimension may, of course, be readily varied by increasing or decreasing the angle of taper without disturbing the amount of hydrostatic pressure area represented by dimension $a$. It is, of course, the case that during such relief or dynamic flow conditions through the annular area $b$ the valve sleeve 76 will be sufficiently displaced to clear from the tapered end of the pin.

To lessen the dynamic instability as is occasionally encountered in relief valve assemblies of this type, it is believed advantageous to route the flow of fluid occurring between the right and left hand chambers of the unit to progress through aperture 64 to within cup 68 and have such flow impinge on the coils of the spring 80 thereby to dampen oscillatory movement tendencies thereof and of the valve sleeve 74 during relief conditions. To this end, exhaust ports 85 for communicating fluid from the closed cup 68 to the left hand working chamber of the unit are situated in the end wall 72.

Given the relief valve type of construction described herein, it is of course necessary to provide some return path of fluid flow to accommodate restoration of the energy dissipating unit 20 back to its illustrated normal extended position following the impact. Such return path may be advantageously provided by a plurality of notches 86 formed in the lip 66. By proper selection of the width of each notch and the number thereof, a desired amount of flow area may be provided to allow such return or restoration of the unit the bias of the gas spring therein, and at a rate of displacement predetermined to best meet the various objectives of bumper system operation.

Having thus described the invention, what is claimed is:

1. A hydraulic energy dissipating unit including an outer cylinder containing a body of fluid, movable wall means inside said cylinder and defining opposite fluid chambers variable in volume during relative movement between said cylinder and said movable wall means under forces applied thereto, and force magnitude control valve means comprising means defining an aperture in said movable wall means communicating said chambers the edge of which aperture defines a fluid orifice of a diameter, an elongated pin affixed to said movable wall means coaxial with said orifice having a shank of a diameter smaller than that of said orifice and with one end of said pin located proximate said orifice, said one end of said pin being formed with a predetermined taper, a valve sleeve mounted slidably on said shank of said pin and including an annular flange adapted to close the annular area intervening said pin and said orifice edge, and spring means urging said valve sleeve to a position engaging said annular flange with said orifice edge, whereby there is provided a hydrostatic pressure area on said annular flange of said sleeve equalling said intervening area and a dynamic orifice flow area larger than the latter to a degree dependent upon said taper of said pin at said one end thereof.

2. The combination recited in claim 1 wherein a retainer cup mounts said pin on said movable wall means and defines a volume with said orifice at one end of such volume, said spring means comprising a coil compression spring, and outlet apertures in said retainer cup at the end of said volume opposite said orifice, whereby fluid flowing through said orifice is directed over the coils of said spring and out said outlet apertures.

3. A hydraulic energy dissipating unit including an outer cylinder containing a body of fluid, movable wall means inside said cylinder and defining opposite fluid chambers variable in volume during relative movement between said cylinder and said movable wall means under forces applied thereto, and force magnitude control valve means comprising means defining an aperture in said movable wall means communicating said chambers bounded by an in-turned lip from said wall means the edge of which lip defines a fluid orifice of a diameter, an elongated pin affixed to said movable wall means coaxial with said orifice having a shank of a diameter smaller than that of said orifice and with one end of said pin located proximate said lip edge, said one end of said pin being formed with a predetermined taper, a valve sleeve mounted slidably on the shank of said pin and including an annular flange adapted to close the annular area intervening said pin and said lip edge, and spring means urging said valve sleeve to a position engaging said annular flange with said lip edge, whereby there is provided a hydrostatic pressure area at said annular flange of said sleeve equalling said intervening area and a dynamic orifice flow area larger than the latter to a degree dependent upon said taper of said pin at said one end thereof.

4. The combination recited in claim 3 further including notches in said annular lip providing a return path of fluid flow of predetermined area when said annular flange is seated on said lip.

5. A hydraulic energy dissipating unit including an outer cylinder containing a body of fluid, movable wall means inside said cylinder and defining opposite fluid chambers variable in volume during relative movement between said cylinder and said movable wall means under forces applied thereto, and force magnitude control valve means comprising means defining an aperture in said movable wall means communicating said chambers bounded by an in-turned lip from said wall means the edge of which lip defines a fluid orifice of a diameter, a retainer cup affixed to said wall means, an elongated pin mounted at one end on said cup and coaxial with said orifice with the outer end of said pin located proximate said orifice edge, said pin having a shank of a diameter smaller than that of said orifice and said other end of said pin being formed with a predetermined taper, a valve sleeve mounted slidably on the shank of said pin and including an annular flange adapted to close the annular area intervening said pin and said lip edge, a coil spring seated between said cup and said wall means urging said valve sleeve to a position engaging said annular flange with said lip edge, means defining notches in said lip providing a return path of fluid flow of predetermined area when said annular flange is seated on said lip, whereby there is provided a hydrostatic pressure area at said annular flange of said sleeve equalling said intervening area and a dynamic orifice flow area larger than the latter to a degree dependent upon said taper of said pin at one end, and means defining outlet apertures in an end of said cup opposite said orifice whereby fluid flowing through said orifice is directed over the coils of said spring and out said outlet apertures.

* * * * *